(12) United States Patent
Fierro et al.

(10) Patent No.: US 6,432,580 B1
(45) Date of Patent: *Aug. 13, 2002

(54) METHOD OF MAKING A NICKEL HYDROXIDE MATERIAL

(75) Inventors: Cristian Fierro, Northville; Michael A. Fetcenko, Rochester Hills; Beth Sommers, Waterford; Avram Zallen, West Bloomfield, all of MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/661,000

(22) Filed: Sep. 13, 2000

Related U.S. Application Data (63) Continuation-in-part of application No. 09/135,477, filed on Aug. 17, 1998, now Pat. No. 6,228,535, and a continuation-in-part of application No. 09/135,460, filed on Aug. 17, 1998, now Pat. No. 6,177,213, and a continuation-in-part of application No. 09/153,692, filed on Sep. 15, 1998, now Pat. No. 6,086,843.

(51) Int. Cl.$^7$ ............................................... H01M 4/32
(52) U.S. Cl. ........................................ 429/223; 429/49
(58) Field of Search ...................... 429/49, 223, 218.1

(56) References Cited

U.S. PATENT DOCUMENTS 5,788,943 A * 8/1998 Aladjov ...................... 429/223
5,789,095 A * 8/1998 Miyagawa et al. ........... 429/49
5,795,673 A * 8/1998 Miyagawa et al. ........... 429/49

* cited by examiner

Primary Examiner—Laura Weiner
(74) Attorney, Agent, or Firm—Dean B. Watson; Marvin S. Siskind (57) ABSTRACT

A process for making a nickel hydroxide material without the necessity of a preamine reactor. The process includes the steps of providing a metal and forming the metal into an active positive electrode material. The process for making a nickel hydroxide material may also include one or more blending steps. The step for forming may include concurrently combining the metal with ammonium ions and hydroxide ions. The step for forming may also include a continuously stirred precipitation reaction of metal ions. In a preferred aspect of the process hereof, the metal may be a secondary nickel source, such as a spent or virgin electrolyte solution from a nickel electrorefining process, nickel electroless plating process or nickel electroplating process.

21 Claims, 4 Drawing Sheets

Tap Density
2.1 g/cc

X-ray
0.85

BET
35 m²/g

Tap Density
1.8 g/cc

X-ray
0.84

METHOD OF MAKING A NICKEL HYDROXIDE MATERIAL

REFERENCE TO RELATED APPLICATIONS

The present invention is a continuation in part of U.S. patent applications: Ser. No. 09/135,477, now U.S. Pat. No. 6,228,535 entitled "Nickel Hydroxide Positive Electrode Material Exhibiting Improved Conductivity and Engineered Activation Energy" by Fierro et al., filed Aug. 17, 1998; and Ser. No. 09/135,460, now U.S. Pat. No. 6,177,213 entitled "Compositive Positive Electrode Material and Method for Making Same" by Fetcenko et al., filed Aug. 17, 1998; and Ser. No. 09/153,692, now U.S. Pat. No. 6,086,843 entitled "Structurally Modified Nickel Hydroxide Material and Method For Making Same" by Ovshinky et al., filed Sep. 15, 1998, the disclosures of which are hereby incorporate by reference.

BACKGROUND OF THE INVENTION

I. Field of the Invention

The present invention pertains to a method for making high density nickel hydroxide for alkali rechargeable batteries. More particularly, the present invention pertains to a method for making nickel hydroxide for a battery electrode from a secondary low cost nickel source.

II. Description of the Background Art

The demand for batteries has grown dramatically over the past decade and continues to grow at a phenomenal rate. Rechargeable batteries with high energy density and high capacity are particularly desirable. Two types of batteries that are widely used are the Ni—Cd (nickel cadmium) type and the more desirable Ni-MH (nickel metal hydride) type. These batteries have a positive and negative electrode. In both types of batteries the positive electrodes are made primarily of nickel hydroxide active material.

Ni-MH cells utilize a negative electrode that is capable of the reversible electrochemical storage of hydrogen. Ni-MH cells usually employ a positive electrode of nickel hydroxide material. The negative and positive electrodes are spaced apart in an alkaline electrolyte. Upon application of an electrical potential across a Ni-MH cell, the Ni-MH material of the negative electrode is charged by the electrochemical absorption of hydrogen and the electrochemical discharge of a hydroxyl ion, as shown in equation 1.

$$M + H_2O + e^- \leftrightarrows M\text{-}H + OH^- \quad (1):$$

The negative electrode reactions are reversible. Upon discharge, the stored hydrogen is released to form a water molecule and release an electron.

The reactions that take place at the nickel hydroxide positive electrode of a Ni-MH cell are shown in equation 2.

$$Ni(OH)_2 + OH^- \leftrightarrows NiOOH + H_2O + e^- \quad (2):$$

The use of nickel hydroxide, $Ni(OH)_2$, as a positive electrode material for batteries is generally known. See for example, U.S. Pat. No. 5,523,182, issued Jun. 4, 1996 to Ovshinky et al., entitled "Enhanced Nickel Hydroxide Positive Electrode Materials For Alkaline Rechargeable Electrochemical Cells", the disclosure which is herein incorporated by reference.

Several forms of positive electrodes exist at the present and include sintered, foamed, and pasted electrode types. Processes for making positive electrodes are generally known in the art, see for example U.S. Pat. No. 5,344,728 issued to Ovshinsky et al., the disclosure of which is herein incorporated by reference, where capacity in excess of 560 mAh/cc was reported. The particular process used can have a significant impact on an electrode's performance. For example, conventional sintered electrodes normally have an energy density of around 480–500 mAh/cc. Sintered positive electrodes are constructed by applying nickel powder slurry to a nickel-plated, steel base followed by sintering at high temperature. This process causes the individual particles of nickel to weld at their points of contact, resulting in a porous material that is approximately 80% open volume and 20% solid metal. This sintered material is then impregnated with active material by soaking it in an acidic solution of nickel nitrate, followed by the conversion to nickel hydroxide by reaction with an alkali metal hydroxide. After impregnation, the material is subjected to electrochemical formation.

To achieve significantly higher loading, the current trend has been away from sintered positive electrodes and toward pasted electrodes. Pasted electrodes consist of nickel hydroxide particles in contact with a conductive network or substrate, most commonly foam nickel. Several variants of these electrodes exist and include plastic-bonded nickel electrodes, which utilize graphite as a microconductor, and pasted nickel fiber electrodes, which utilize spherical nickel hydroxide particles loaded onto a high porosity, conductive nickel fiber or nickel foam support.

The production of low cost, high capacity nickel hydroxide is critical to the future commercialization of Ni-MH batteries. As with electrode formation, the properties of nickel hydroxide also differ widely depending upon the production method used. Generally, nickel hydroxide is produced using a precipitation method in which a nickel salt and a hydroxide salt are mixed together followed by the precipitation of nickel hydroxide. Active, nickel hydroxide material preferably has high capacity and long cycle life, see U.S. Pat. No. 5,348,822 to Ovshinsky et al., the disclosure of which is herein incorporated by reference.

It has been discovered that nickel hydroxide suitable for use in a battery electrode should have an apparent density of 1.4–1.7 $g/cm^3$, a tap density of about 1.8–2.3 $g/cm^3$, and a size range of about 5–50$\mu$. Active, nickel hydroxide particles are preferably spherical in shape with a high packing density and a narrow size distribution Preferably, average particle size should be about 10 $\mu$m and tap density should be about 2.2 g/cc. Paste made with this kind of nickel hydroxide has good fluidity and uniformity, and thus it is possible to fabricate high capacity, uniformly loaded electrodes. The use of this kind of nickel hydroxide also improves the utilization of the active material and discharge capacity of the electrode. If the process is not carefully controlled, the precipitate will have an irregular shape and/or low tap density. For example, if the rate of reaction is too fast, the precipitate formed may be too fine and the density too low. A fine powder with low density requires longer filtering or washing times and increases the adsorption of water on the surface. Further, if the precipitated particles have too wide a size distribution (ranging from 1 to hundreds of microns), the nickel hydroxide may require pulverization to render it useful. Electrodes formed with low-density nickel hydroxide will lack high capacity and high energy density. For these reasons and others, an active powder having an irregular shape and/or low density is less than desirable for use as a high capacity battery electrode material.

In order to produce high density, substantially spherical nickel hydroxide, particles are gradually grown under carefully controlled process conditions. A nickel salt provided in solution is combined with an ammonium ion. The nickel salt forms complex ions with ammonia to which caustic is added. Nickel hydroxide is then gradually precipitated by decomposition of the nickel ammonium complex. The reaction rate is difficult to control, so methods have been introduced to separate critical steps in the production process to compensate for said difficulties. For example, U.S. Pat. No. 5,498,403, entitled "Method for Preparing High Density Nickel Hydroxide Used for Alkali Rechargeable Batteries", issued to Shin on Mar. 12, 1996, the disclosure of which is herein incorporated by reference, discloses a method of preparing nickel hydroxide from a nickel sulfate solution using a separate or isolated amine reactor. Nickel sulfate is mixed with ammonium hydroxide in the isolated amine reactor to form a nickel ammonium complex. The nickel ammonium complex is removed from the reactor and sent to a second mixing vessel or reactor where it is combined with a solution of sodium hydroxide to obtain nickel hydroxide. Such a method relies heavily on a raw material source of very high purity or what is termed throughout the ensuing specification as primary nickel.

Thus, particular notice should be taken in the fact that all of present day processes for making positive electrode materials, such as those described above, have utilized expensive, high grade, and highly pure primary nickel for the production of nickel salt starter solutions. As modem process technology and automation have reduced the cost of labor in the production of battery electrode materials, the cost of primary nickel and its associated salts have become a significant factor in determining the cost of active electrode materials, battery electrodes, and the batteries the electrodes are placed within, making up as much as 60% of the direct manufacturing cost of the final nickel hydroxide.

Primary nickel used for the production of active materials is typically derived from the ores of nickel sulfide and nickel oxide and purified by electro-processes. Nickel sulfide ores are refined by flotation and roasting to nickel oxide. Nickel oxide ores are typically refined by hydrometallurgical refining, such as leaching with ammonia. Refined nickel ore is usually cast into nickel anodes for distribution as primary nickel. The highly pure, primary nickel may then be dissolved into solution, such as a sulfate solution, and sold as highly pure aqueous nickel sulfate, with a frequent end use also being nickel electroplating and electroless nickel plating.

The average amount of nickel estimated to be present in the earth's crust is only about 0.0084 wt %, as reported on page 14–14 of the *Handbook of Chemistry and Physics*, 78th Edition, 1997–1998. Because nickel is used for many things, including the production of stainless steel, the demand for nickel is very high, making it a relatively expensive metal. Although primary nickel is a commodity product, it is subject to wild market swings in price. For example, during the period of Jun. 1, 1999 through Jun. 1, 2000, nickel prices have seen dramatic volatility having a low of 2.16 $/lb and a high of 4.77 $/lb as reported on the London Metal Exchange. As a means of off-setting or hedging against the increasing cost of nickel, a number of large producers of nickel hydroxide have gone so far as to purchase ownership interests in nickel mines. Smaller manufactures of nickel hydroxide, unable to offset rising nickel prices, have been left at a competitive disadvantage.

Thus, present day methods of producing nickel hydroxide from highly pure nickel lack a material independent source of nickel that is not driven by the market costs of primary nickel.

One particular source of nickel not presently utilized for the production of nickel hydroxide for battery electrodes is that of secondary nickel or nickel by-product. Secondary nickel is that nickel which is derived from either process or waste streams unrelated to primary nickel or the production of high purity nickel, or is nickel from spent or virgin solutions used in electroplating or electroless plating of nickel. One way to characterize secondary nickel is by its history of use. Although present methods may exist for refining nickel, see for example U.S. Pat. No. 5,861,131, the disclosure of which is herein incorporated by reference, such methods do not provide a secondary nickel source of suitable quality for the production of nickel hydroxide materials used in battery electrode materials. Additionally, the background art fails to teach or suggest the use of any secondary nickel or nickel by-products for use in active battery electrode materials, especially nickel hydroxide production. While these secondary nickel sources cannot be classified entirely as waste, the cost of using secondary nickel dramatically reduces overall cost of active materials.

Thus, there exists a long felt and presently unfulfilled need for an alternative to primary nickel for the production of battery electrodes and electrode materials.

SUMMARY OF THE INVENTION

The subject invention addresses the above stated problems and others by, among other things, providing a method for making nickel hydroxide using a novel starting material. Nickel electroplating and electroless plating solutions, including both virgin and spent solutions and various types of waste streams having metal ions are generally known but have not heretofore been used to produce active, battery electrode materials. Thus, the present invention provides a new use for a secondary metal or metal waste stream, by using the metal as a starter material for the production of an active, positive electrode material.

The battery electrode material is preferably a substantially spherical, high density nickel hydroxide material or nickel oxyhydroxide material, which may comprise one or more modifiers or modifier elements. Preferred modifier elements include those selected from the group consisting of Al, Ba, Bi, Ca, Co, Cr, Cu, F, Fe, In, K, La, Li, Mg, Mn, Na, Ru, Sb, Sn, Sr, Ti, and Zn, etc. In particular, modifiers of Co, Zn, Ca, Mg, Cu, Al and Li are more preferred.

Generally, the invention provides a method for making nickel hydroxide battery electrode materials from secondary nickel or a secondary nickel source where nickel is a by-product.

The method includes the steps of: providing secondary nickel as a source of nickel; formulating the secondary nickel into a solution; adding a precipitating agent to the solution in an amount effective to precipitate a nickel salt; separating the nickel salt from the solution; dissolving the separated nickel salt into a nickel salt solution; evaporating a portion of the nickel salt solution to precipitate a nickel salt precipitate; and converting the nickel salt precipitate into an active positive electrode material.

A second aspect of the invention recognizes that to utilize the secondary nickel source, the precipitation process is crucial to the ultimate suitability of the nickel hydroxide end product. Thus, a single precipitation reaction, instead of the common two reactor system with a preamine initial reaction, allows the use of a secondary nickel source.

A third aspect of the invention recognizes that the utilization of a secondary nickel source need not be an all or nothing proposition, and that particular end formulas of the nickel hydroxide may have more or less tolerance to the secondary nickel source. The method thereby recognizes that the "as is" secondary nickel source may be substituted at least in part due to the presence of impurities and concentration difficulties. A novel approach of blending solutions using primary and secondary nickel is disclosed.

A fourth aspect of the invention recognizes that the battery end use may dictate certain performance properties, such as paste loading and capacity. In this case, a novel approach of blending nickel hydroxide made from primary nickel together with nickel hydroxide made from secondary nickel is disclosed.

Still, another aspect of the invention is to recycle "out of specification nickel hydroxide" back into nickel sulfate solution suitable for making new nickel hydroxide. The "out of specification nickel hydroxide" may be reactor startup scrap, transition material formed between chemical formula changes, or material resulting from production issues such as power outages, equipment failure, etc.

Nickel hydroxide material produced in accordance with the present method provides particles having a shape, a particle size, a tap density, and a crystallinity suitable for use as an active positive electrode material. For a more complete understanding of the present invention, reference is made to the following detailed description and accompanying drawings.

DETAILED DESCRIPTION OF THE PREFERRED EMBODIMENTS

Figure 1:
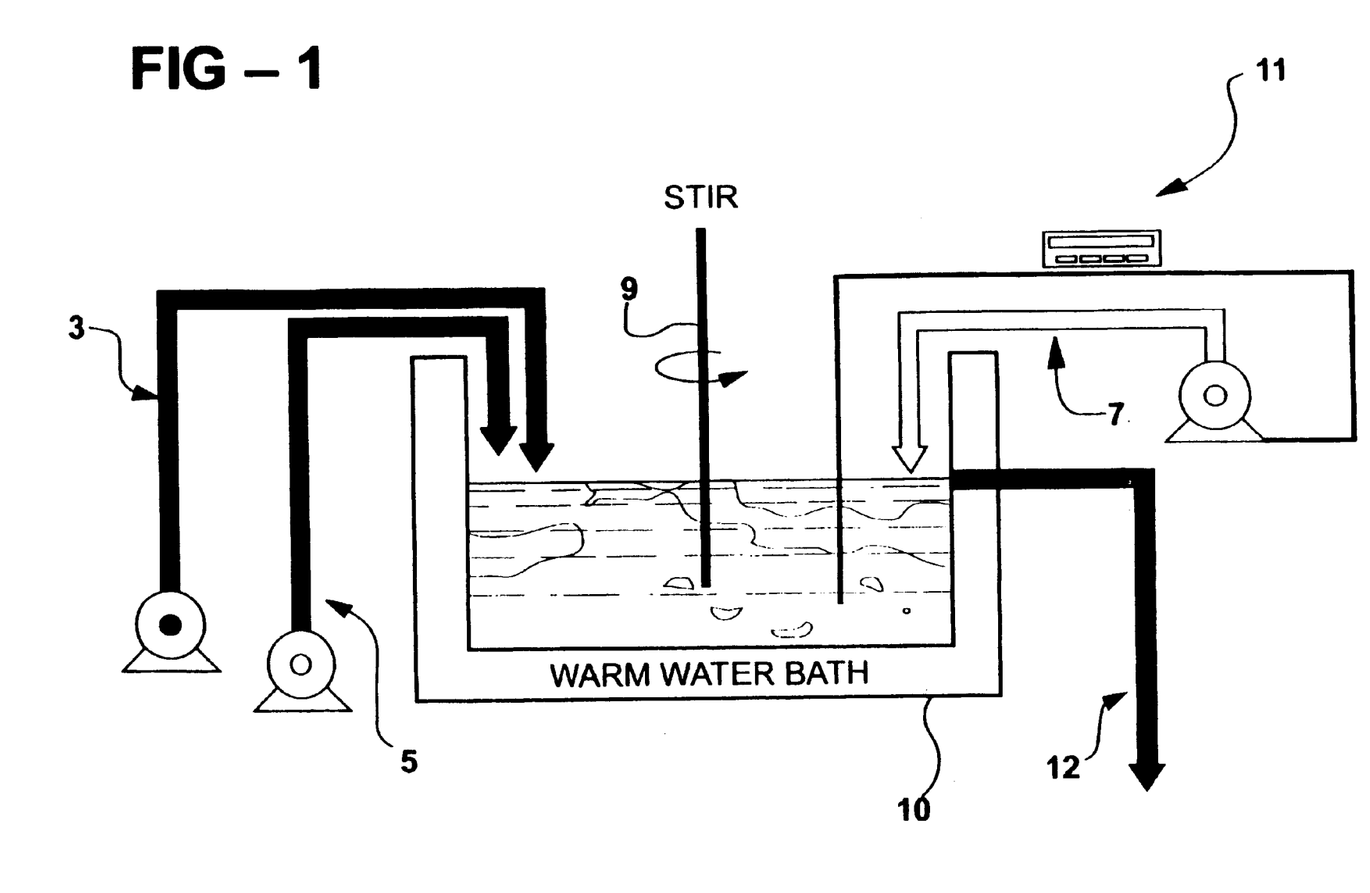
FIG. 1 is a schematic of a system for preparing nickel hydroxide in accordance with a preferred aspect of the present invention.

FIG. 1 illustrates a novel precipitation process used to make nickel hydroxide from either primary or secondary nickel sources without a preamine reactor, the process of which is discussed in detail below. A single reactor system is preferred for practicing the present invention as the single reactor system provides improved process control, avoids premature precipitation, and permits greater system tolerance for unknown dissolved materials.

Figure 4:
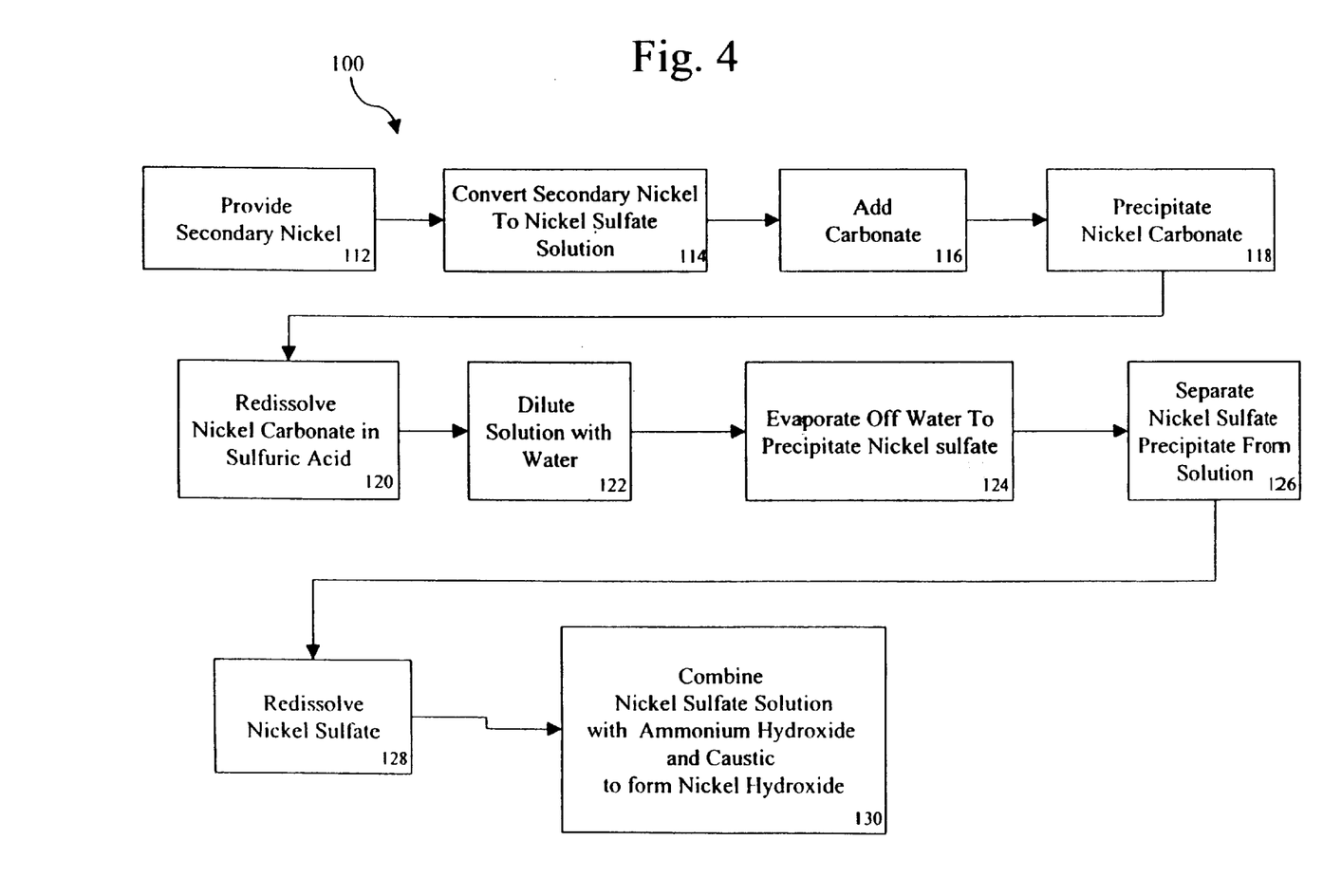
FIG. 4 is a process flow diagram of a method for preparing nickel hydroxide in accordance with the present invention.

Now referring to FIG. 4, generally depicted therein at 100 is a process flow diagram of a method for making a nickel hydroxide active material from an initial, secondary metal source having unknown dissolved materials in accordance with the present invention. The secondary metal source is preferably a secondary nickel source having at least one contaminate that adversely effects the utilization of the metal source for electroplating and electroless nickel plating. The secondary nickel source may also be of unsuitable quality for use as a battery electrode material if used directly in a nickel hydroxide production process.

The secondary nickel source surprisingly substitutes as a raw material source for high purity nickel, thus such nickel is termed secondary nickel. Secondary nickel is defined as any nickel metal, nickel metal alloy or other nickel containing material where nickel is provided as a by-product or as a waste metal from a metal process stream or a metal waste steam. Primary nickel, on the other hand, is high purity nickel typically obtained from nickel ore and. Primary nickel is often electrolytically refined or cast into a single crystal anode for distribution, e.g. is refined by an electro-process as opposed to an electroless processes. Primary nickel is high purity nickel, such as reagent grade nickel having metal impurities of less than 0.05% by weight. Secondary nickel, on the other hand, is preferably provided as residual, used, or waste nickel from a metal process stream, such as a metal plating bath, plating waste stream, metal electrorefining operation, electroplating operation, nickel plating solution, nickel electroplating operation, electroless nickel plating operation, copper refining operation, copper plating operation or any combination thereof. The secondary nickel may be a spent or virgin solution. Thus, one manner of characterizing secondary nickel is from its history of use as being initially prepared for a process other than making nickel hydroxide or as being used material from a commercial process.

The secondary nickel source may supply nickel in any suitable form. For example, the secondary nickel source may supply nickel in either a solid or solution form. The nickel of the secondary nickel source is preferably supplied as a nickel sulfate solid or a nickel sulfate solution. The nickel may also be provided as nickel nitride, nickel chloride, nickel acetate, nickel carbonate, etc. If the nickel is provided as a nickel salt in the form of a solid, the nickel salt is preferably converted to a sulfate solution. Changing the nickel salt to a nickel sulfate solution may be accomplished by any suitable method, for example, ammonium extraction, precipitation and redissolution with concentrated sulfuric acid. A nickel sulfate starter solution provides a readily usable form of nickel for the production of active, nickel hydroxide material.

The initial, secondary nickel source may comprise a wide range of contaminants including both organic materials and inorganic materials. Undesirable contaminates, unlike modifiers, are contaminants that may interfere with the proper functioning or construction of the positive electrode due to elemental properties or an overly high concentration. The secondary nickel or nickel source may have at least one contaminant metal selected from the group of elements consisting of Fe, Cu, Mn, Pb, Ca, Mg, Na. These contaminants may enter the nickel solution from a number of sources, such as during normal or irregular production processes, like during an electroplating operation for example. Undesirable contaminates also include elements or compounds that could interfere with the nickel hydroxide formation process itself, such as proper precipitation of nickel hydroxide. For instance, a high concentration of contaminants can result in low energy density, low capacity, low tap densities, low surface areas, poor particle shape or poor crystallinity, etc. In any respect, if the initial secondary nickel source has contaminants that are higher than those reported as trace elements in high purity nickel, such as greater than 0.05 wt %, and more preferably greater than 0.4 wt % or higher, such as: greater than 4 wt %, greater than 6 wt %, greater than 8 wt %, greater than 10 wt % or greater than 12 wt %. As such, secondary nickel sources having such high contaminate concentrations have not heretofore been used as a nickel hydroxide starter material.

It has been particularly found that when sodium is present in the initial secondary nickel source at a concentration of greater than 9% total dissolved metals, the secondary nickel or nickel source may effect the production quality of nickel hydroxide powder. For example, it has been found that when sodium is present in the initial secondary nickel sulfate solution at in amount greater than 4 g/l, nickel hydroxide produced from the secondary nickel source has poor crystallinity and low tap density.

The secondary nickel source may additionally include minor amounts of elements that may be beneficial to or neutral to the final active product. Beneficial elements include various modifier elements. These elements may be present in low amounts of less than 9 wt % and include Co, Zn, Mg, Ca, Mn, Cu, etc., as discussed in detail in U.S. patent application Ser. No. 5,348,822 and co-pending U.S. patent applications Ser. Nos. 09/135,477 and 09/135,460.

For example, commercial nickel sulfate is sold with a high purity level, such as less than 0.05% dissolved metals. The following is an ICP analysis in g/l of primary nickel in the form of a nickel sulfate solution.

Ni: 151.1
Co: 0.0
Cd: 0.0
Zn: 0.0
Fe: 0.0
Cu: 0.0
Mn: 0.0
Pb: 0.0
Ca: 0.0
Mg: 0.0
Na: 0.03

Secondary nickel is not very pure, in fact secondary nickel contains a multitude of contaminants. The following is an ICP analysis in g/l of a secondary nickel in the form of a spent nickel sulfate solution from a nickel plating operation.

Ni: 136.7
Co: 0.0
Cd: 0.0
Zn: 0.0
Fe: 0.36
Cu: 0.12
Mn: 0.08
Pb: 0.0
Ca: 0.85
Mg: 0.22
Na: 16

Regardless of what form the initial secondary nickel is provided as, i.e. whether the secondary nickel is a solid or in a solution, the secondary nickel is eventually converted to or provided as a nickel salt solution. The nickel salt solution preferably has a concentration of at least 100 g/l of nickel to the maximum solubility level of nickel. The nickel salt solution is preferably a nickel sulfate solution. It has been found that low levels of nickel can form excellent nickel hydroxide material where nickel is present at levels of only 100 g/l to 140 g/l by using the single reactor system of the present invention.

The nickel salt solution is preferably taken through at least one precipitation reaction to remove undesirable contaminants and provide a nickel salt precipitate. The precipitation reaction may be accomplished by any suitable precipitating agent. Preferably the precipitating agent is a carbonate salt solution. The carbonate is added in an amount effective to precipitate nickel carbonate. As such, the carbonate is preferably added in excess to the nickel salt solution. The carbonate may be any type of carbonate capable of precipitating a nickel carbonate solid, such as sodium carbonate, potassium carbonate, sodium bicarbonate, potassium bicarbonate, combinations of the above, or the like. The carbonate is preferably a sodium carbonate solution. With an excess amount of sodium carbonate added to the nickel salt solution, nickel carbonate readily precipitates out leaving behind various organics, inorganics, nitrogen containing compounds, and surfactants, including large amounts of copper and sodium. It has been found by the present inventors, that despite the added costs of extra processing, savings in raw material costs more than offset the extra processing steps. Thus, the present invention provides a method of making nickel hydroxide with a secondary metal using a non-electrolytic means or process for reducing the contamination of the secondary nickel in an amount sufficient for use in as active battery material.

The nickel salt precipitate is separated from the carbonate solution by filtering or decanting and rinsed to remove additional contaminates. Filtering includes any of the known filtering methods, such as gravity filtration, vacuum filtering, etc. Rinsing includes washing the precipitate with water and/or other solvents, such as ethanol, toluene, acetone, etc. Separating the nickel salt precipitate from the initial solution leaves behind various contaminants that readily dissolve in water and/or the other solvents.

The nickel salt precipitate is next redissolved in solution and re-precipitated as a nickel sulfate starter salt of suitable quality for use in making an active positive electrode material. Preferably, the nickel salt precipitate is dissolved in sulfuric acid to form a nickel sulfate solution and then precipitated out with a condensation precipitation step. The sulfuric acid is preferably concentrated sulfuric acid having a concentration range of 50% to 99%. A condensation precipitation step provides superior nickel sulfate in comparison to nickel sulfate without a condensation precipitation step. For example, the nickel carbonate precipitate formed above may be dissolved in sulfuric acid to form a nickel sulfate solution. The sulfuric acid/nickel sulfate solution is then diluted with water. Water is evaporated from the nickel sulfate solution to precipitate a nickel sulfate solid. The nickel sulfate solid is separated from the sulfate solution by any suitable separation process, such as filtration, decantation, etc. The nickel sulfate solid may then be redissolved in water to form aqueous nickel sulfate suitable for use as a nickel hydroxide starter solution.

The aqueous nickel sulfate starter solution is used to form high quality nickel hydroxide material. As shown in FIGS. 1 and 4, nickel hydroxide material is preferably prepared by simultaneously combining the nickel sulfate starter solution made from a secondary nickel source, sodium hydroxide and ammonium hydroxide in a single reaction vessel to form nickel hydroxide particles. The combined solution is preferably continuously and rapidly stirred or agitated. Nickel hydroxide particulates are grown at a temperature and a pH that readily precipitates nickel hydroxide upon formation. The nickel hydroxide material produced in accordance with the present invention has high density, uniform, spherical particles with a crystallite size of less than 120 angstroms. This is in sharp contrast to materials of the prior art where the particles typically have crystallite sizes greater than 120 angstroms. More specifically, the crystallite size of the particles of the nickel hydroxide material are produced in the range from 50–150 angstroms, more preferably 60–103 angstroms and most preferably 70–100 angstroms. These materials provide superior capacity and are therefore designated high quality nickel hydroxide material.

A second aspect of the invention recognizes that to utilize the secondary nickel source, the precipitation process itself is crucial to the ultimate formation of high quality nickel hydroxide end product. A single precipitation reactor, instead of the common two reactor system with a preamine initial reactor, allows the use of a modified secondary nickel source. The inventors believe that a preamine reactor or preamine process is especially undesirable in accommodating a secondary nickel source having impurities greater than those found in commercial, high purity nickel sulfate.

Now in more detail and as briefly described above, the present invention provides a process for making active positive electrode materials using a secondary nickel source, the process of which is shown in FIG. 1. The process comprises combining $MeNO_3$, $MeSO_4$(3), $NH_4OH$(5) and NaOH(7) in a single reactor (10), maintaining the reactor at a constant temperature of 20–100° C. (more preferably 40–80° C. and most preferably 50–70° C.), agitating (9) the combination at a rate of 400–1000 rpm (more preferably 500–900 rpm and most preferably 700–850 rpm), controlling the pH (11) of the agitating combination at a value between 9–13 (more preferably at 10–12 and most preferably at 10.5–12.0) and controlling both the liquid phase and vapor phase ammonia concentration. The Me or metal combinations set forth above include Ni, various metal modifier(s) that will be incorporated into the final modified nickel hydroxide materials, and contaminants. Additional modifiers may be selected from the group consisting of Al, Bi, Co, Cr, Cu, Fe, In, La (and other rare earth metals), Mg, Mn, Ru, Sb, Sn, Ti, Zn, Ba, Si and Sr.

The $MeSO_4$ solution is formulated by mixing 3–30 wt %, more preferably 5–25% and most preferably 7–12% nickel as nickel sulfate with other sulfate solutions containing the desired modifier(s). Overall, the metal sulfate solution added to the reactor is 0.05–3 M, more preferably 0.5–3 M and most preferably 1–3 M. The $NH_4OH$ solution added to the reactor is 1–15 M, more preferably 5–15 M and most preferably 10–15 M solution. The NaOH solution added to the reactor is 5–50 wt %, more preferably 8–40 wt % and most preferably a 15–30 wt %. Deionized water is preferably used throughout for all necessary dissolutions and dilutions.

As stated above, the pH of the mixture in the reactor must be controlled. The control of the pH can be accomplished by any appropriate method, preferably through the addition of a base as needed. The addition of a base such as KOH or NaOH is preferred. Most preferably, 20–60 wt % KOH or NaOH is used. The temperature of the mixture in the reactor should be maintained at the temperatures described above. In order to assure optimum contact between the components of the mixture introduced into the reactor, constant mixing or agitation should be provided. Mixing may be provided by any suitable method, such as stirring, agitating, vortexing or ultrasonic, but must attain the agitation rates as set forth herein above.

In order to efficiently incorporate calcium into the bulk of the modified nickel hydroxide material of the present invention, it is preferable that the calcium is not part of the metal sulfate solution ($MeSO_4$), rather, calcium should be formulated using a separate solution and introduced using a separate feed stream. Preferably, the feed stream is $CaCl_2$ or other solublizing solution, such as calcium nitrate, calcium acetate, etc. where Ca may be introduced independently to the reactor. A separate solution may also be used for other insoluble materials that are desired to be provided in the bulk active material. The Ca salt solution introduced into the reactor is 0.005–20 wt %, more preferably a 0.005–2.0 wt % and most preferably 0.005–1.0 wt %. Thus, in a preferred embodiment of the preset invention, the method provides a novel continuous precipitation process that is capable of producing a nitrate free active positive electrode material.

The addition of each of the components and the removal of the resultant slurry (containing precipitated nickel hydroxide material) is carefully controlled at complimentary rates so that the slurry contains a maximum amount of precipitate and a minimum amount of un-reacted components. The above described operating conditions for a continuous process have provided a remarkably high yield of 99.98%. The process is novel in several respects. First, it is completely new to apply a continuously stirred tank reactor (CSTR) concept to the manufacture of nickel hydroxide. Prior art references (see Hyundai Motor Company U.S. Pat. No. 5,498,403) indicate the necessity of employing two reactors, in series, involving the formation of a preamine complex. The two reactor approach has been considered vital in order to achieve high density, spherical nickel hydroxide particles. However, the inventors believe two reactors in fact produce tremendous difficulties in balancing two vastly different reaction rates, that being the preamine complexing and the actual nickel hydroxide precipitation which possess a number of disadvantages. Disadvantages of a two reactor approach include:

premature precipitation in the first reactor resulting in poor tap density and uncontrolled particle size.

poor yield because very high excess ammonia must be used in the first reactor.

high effluent usage because of the need for dilute sulfate solution.

complexity from an automatic control standpoint in balancing two reaction rates.

Premature equipment failure from corrosion in the second reactor due to the high pH (>12) necessary to break the nickel ammonia complex.

The prior art, two reactor approach was also considered vital to ensure the formation of a nickel ammonium complex prior to precipitation, to slow the precipitation reaction and allow high density particles to form. The objective of high powder density cannot be overstated for use in batteries, as active material loading is crucial to the energy density of the overall positive electrode and the overall battery system. All known attempts to precipitate high density spherical nickel hydroxide without careful formation of the nickel ammonium complex fail to achieve commercially viable high density material which has inevitably led to a worldwide use of the two reactor manufacturing process.

The present inventors have also found that a CSTR approach vastly simplifies processing. The inventors realized that the nickel ammonium complex can be formed and destroyed simultaneously, that a short-life nickel ammonium complex is not a problem as normally thought by others. Therefore, under the reactant concentrations described previously, and the reactor conditions of temperature, mixing, pH and constituent concentrations, formation of the nickel ammonia complex and subsequent immediate precipitation to nickel hydroxide can occur simultaneously. The inventors have further recognized that the single reactor CSTR process can be used with a number of advantages, including:

the use of highly concentrated reactant solutions, effectively reducing the amount of effluent streams.

the use of lower pH, thereby extending equipment and process control life and reliability.

eliminating the need to "balance" two reactors, thus enhancing simplicity in processing.

Once the slurry is drawn off from the reactor, it is filtered to separate the precipitate from the liquid. The liquid is then recycled and the precipitate processed to produce the modified nickel hydroxide of the present invention.

It is thus possible to produce nickel hydroxide materials having three modifiers, four modifiers, or more without premature precipitation and process failure. These modifier elements are preferably selected from the group consisting of: Al, Bi, Ca, Co, Cr, Cu, Fe, In, La, Mg, Mn, Ru, Sb, Sn, Ti, Y, and Zn. Preferred multi-element modifiers are used to form nickel hydroxide materials having a base formula selected from the following:

$(NiCo)(OH)_2$
$(NiCoZn)(OH)_2$
$(NiCoZnMgCa)(OH)_2$
$(NiCoZnMnMgCa)(OH)_2$
$(NiCoZnMgCaCuMn)(OH)_2$

These modifies may be supplied with the initial, secondary nickel or added at a separate stage in the process. Compositional modifiers may be added in an amount sufficient to improve various characteristics of the positive electrode, many of which are known to those skilled in the art of making said electrodes. As such, a secondary nickel or nickel source having minor amounts of the above modifiers may be particularly useful in preparing nickel hydroxide materials for a battery electrode. Examples of nickel hydroxide materials having varying compositions and applicable to the present invention include those described above, in the background and others, including U.S. Pat. Nos. 5,523,182; 5,348,822; 5,344,728; and 6,019,955, the disclosures of which are herein incorporated by reference.

For other examples of nickel hydroxide materials particularly applicable to the present invention, see also commonly assigned, co-pending U.S. patent application Ser. No. 09/135,460, entitled "Composite Positive Electrode Material and Method for Making Same" filed Aug. 17, 1998. Disclosed therein is a composite positive electrode material for use in electrochemical cells. The composite material is formed with high purity nickel to produce nickel hydroxide powder particles having a conductive material at least partially embedded within the particles. The composite material may be formed by combining a metal ion solution, a caustic solution, and the conductive metallic material whereby a composite precipitate is formed. The combining step may comprise mixing the metal ion solution and the conductive material to form a suspension and adding caustic to precipitate a composite, positive electrode material.

EXAMPLE 1

Figure 2:
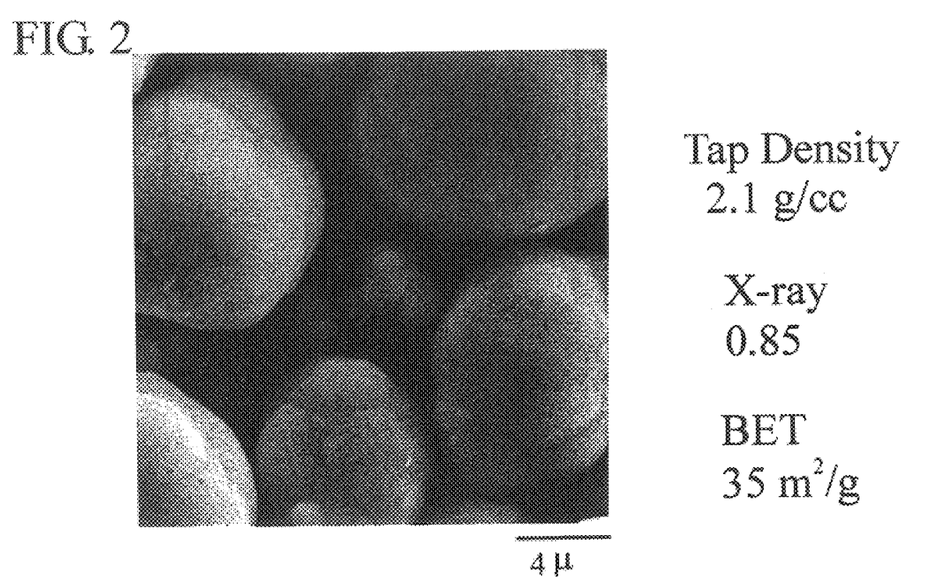
FIG. 2 is a magnified view of nickel hydroxide prepared by the method of the present invention with secondary nickel.

NaOH from tank 12, MeSO$_4$ (consisting of secondary NiSO$_4$, CoSO$_4$, MgSO$_4$ and ZnSO$_4$ from tank 14, NH$_4$OH from tank 16, and Ca(NO$_3$)$_2$ from tank 18 were introduced into the reactor 10. As the ingredients were introduced, they were constantly stirred, as by propeller 20, at about 850 rpm and the contents of the reactor were maintained at about 50° C. The pH of the mixture was maintained at about 12. The resulting precipitate of modified nickel hydroxide material is depicted in FIG. 2 and had the following target metal composition:

$$Ni_{91}Co_{4.5}Zn_{4.5} \qquad (1)$$

This process was repeated with modified quantities of precursor constituents to yield modified nickel hydroxide having the following target metal compositions in atomic %:

$$Ni_{91}Co_7Zn_{0.5}Mg_{0.5}Ca_1 \qquad (2)$$

$$Ni_{93.5}Co_5Zn_{0.5}Mg_{0.5}Ca_{0.5} \qquad (3)$$

$$Ni_{91}Co_3Zn_1Mg_1Ca_2Cu_2 \qquad (4)$$

$$Ni_{95}Co_3Zn_{0.5}Mg_{0.5}Ca_1 \qquad (5)$$

$$Ni_{90.5}Co_3Zn_1Mg_1Ca_{2.0}Cu_{1.5}Al_{1.0} \qquad (6)$$

$$Ni_{86}Co_7Zn_6Mg_{0.5}Ca_{0.5} \qquad (7)$$

$$Ni_{93}Co_5Zn_{0.5}Mg_{0.5}Ca_1 \qquad (8)$$

In the processing method of the instant invention, great care must be taken with certain unexpected processing parameters. For instance, the liquid saturation of ammonia versus its vapor or head space saturation in the reactor is critical. The present inventors have found the ammonia concentration in the reactor significantly influences the final properties of the resultant powder with respect to crystallinity and tap density. Since ammonium hydroxide is continuously metered into the reactor, but is present in excess, part of the ammonia must be removed via the reactor head space. The inventors have found that care must be exercised to avoid a "crust" forming on the top of the liquid; that is to avoid the liquid surface area in the reactor that is exposed to air from inadvertently charring. The inventors also control the incoming and exiting air stream in terms of air flow rate and humidity. For a 100 kg/day reaction vessel, the inventors have determined that an air flow of about 50 or greater ft$^3$/minute is adequate, with a relative humidity below about 65%. Properly managed, the materials of the present invention having the proper density and degree of crystallinity are consistently obtainable in volume production. If, on the other hand, process parameters, such as head space saturation or concentration of ammonia are ignored, it is more likely than not that poor quality nickel hydroxide material will be produced.

Nickel hydroxide materials having the target composition of $(Ni_{91}Co_{4.4}Zn_{4.5})(OH)_2$ were produced in accordance with the present invention using a single reactor system described above with one sample using primary nickel sulfate and the other using secondary nickel sulfate. The active materials were formed into sealed c-cells in a manner well known in the art and tested for capacity at c/5 discharge rates at room temperature. The results are listed below in Table 1.

TABLE 1

CAPACITY COMPARISION

| Rate | Primary Nickel c/5 | Secondary Nickel c/5 |
| --- | --- | --- |
| CAP (0.9 V) /Ah | 5.02 | 5.06 |
| % C/5 CAP | 100 | 100 |
| CAP (1.0 V) /Ah | 4.96 | 4.90 |
| % C/5 CAP | 99 | 98 |
| MIDPOINT /V | 1.23 | 1.19 |

The results in Table 1 show that nickel hydroxide material made with secondary nickel, does not suffer significant reduced capacity at a c/5 discharge rate.

The present invention may optionally include one or more blending steps. Blending may be used to improve the composition of the initial nickel sulfate solution, an intermediate solution or the final nickel hydroxide product. The optional blending step may include blending the initial secondary nickel source as in a raw material blending step, blending intermediate solutions, and/or blending the final, nickel hydroxide product. As the present invention encompasses a wide range of secondary nickel sources, blending provides a means of tailoring the nickel hydroxide to a particular end use regardless of the contaminants present in the secondary nickel.

For instance, a raw material blending step may include mixing a secondary nickel with a primary or other high purity nickel, such as another secondary nickel. Nickel provided from secondary nickel and blended with a nickel of a higher purity provides a nickel source of intermediate purity having a composition different from the initial secondary nickel. Raw material blending may include either wet blending, dry blending or both. Dry blending may be accomplished by combining metal powder of a first secondary nickel source having a first purity with a second nickel source having a second purity. Alternatively, wet blending may be used to produce a nickel starter material. Wet blending may be accomplished by combining a secondary nickel solution having a first purity with a nickel solution having a second purity to provide a nickel solution having a graded purity. For example, secondary nickel may be provided in the form of a nickel sulfate solution. The secondary nickel sulfate solution may be mixed with a nickel sulfate solution of higher purity to reduce the concentration of contaminants in the total nickel solution to a level suitable for use in making an active positive electrode material.

Figure 3:
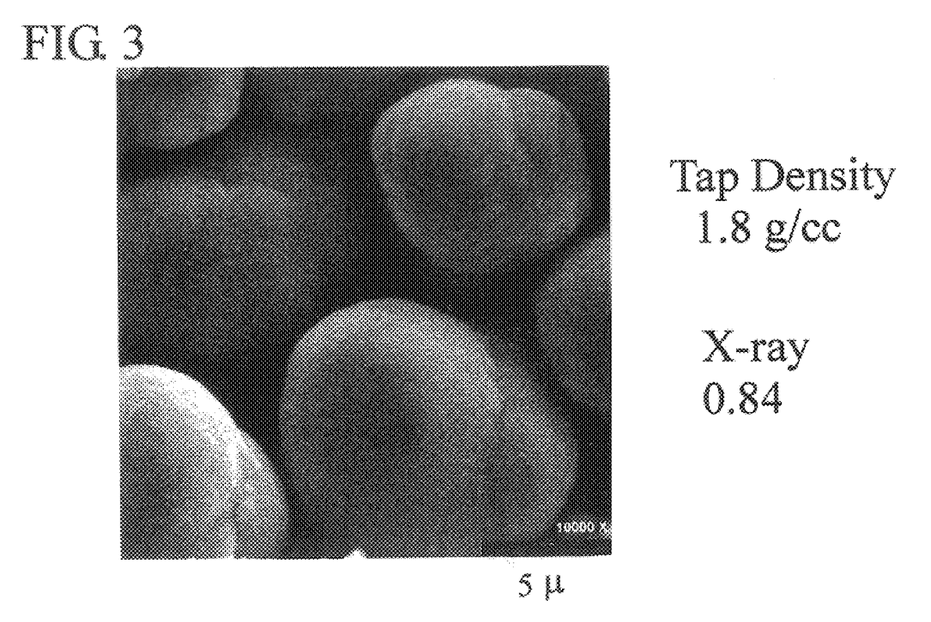
FIG. 3 is a magnified view of nickel hydroxide material prepared by the method of the present invention using a 50% raw material blend.

Also, the present method for making may include an intermediate blending step. An intermediate blending step may be carried out on one or more intermediate solutions or solids by mixing the solutions or solids with an intermediate solution of higher purity in a fashion similar to that of raw material blending. Shown in FIG. 3, is an example of a nickel hydroxide material having a target metal composition of $Ni_{93}Co_5Zn_{0.5}Mg_{0.5}Ca_{1.0}$ made with a 50/50 blend of primary nickel sulfate solution and secondary nickel sulfate solution. Thus, while raw material blending is used to reduce contamination levels for an initial nickel source, an intermediate blending step may be used to reduce contamination of nickel sulfate just prior to feeding the $MeSO_4$ into the nickel hydroxide production process.

The present method for making may also include a final product-blending step. A final product blending provides an enhanced nickel hydroxide material suitable for use in an electrochemical cell. The step for final product blending is preferably a dry blending process, wherein a first nickel hydroxide powder, produced in accordance with the method of the present invention and having a first purity is combined with one or more powders of nickel hydroxide material having a composition which differs from the first nickel hydroxide. Preferably, the overall composition of the nickel hydroxide powder formed has a concentration of contaminants lower than that of the nickel hydroxide material formed without the blending step. Final product blending may therefore provide active, positive electrode material having significantly enhanced surface area, tap density, and crystallinity over that of a non-blended active, positive electrode material.

Nickel hydroxide materials having the target composition of $(Ni_{91}Co_{4.5}Zn_{4.5})(OH)_2$ were produced in accordance with the present invention using a single reactor system described above where one sample was made with primary nickel sulfate and the other was made with a secondary nickel sulfate raw material blend. The nickel hydroxide made with raw material blend used a 50/50 secondary nickel sulfate/primary nickel sulfate mixture to make nickel hydroxide. The active materials produced by each of the processes were formed into sealed c-cells in a manner well known in the art. Each c-cell was tested for capacity at a c/5 discharge rate at room temperature to compare blended final product with non-blended nickel hydroxide. The results are listed below in Table 2.

TABLE 2

COMPARISON OF NONBLENDED & BLENDED MATERIAL

| Rate | Primary Nickel c/5 | Blended Secondary Nickel c/5 |
|---|---|---|
| CAP (0.9 V) /Ah | 4.65 | 4.61 |
| % C/5 CAP | 100 | 100 |
| CAP (1.0 V) /Ah | 4.58 | 4.53 |
| % C/5 CAP | 98 | 97 |
| MIDPOINT /V | 1.24 | 1.24 |

The results in Table 2 show that nickel hydroxide material made with blended secondary nickel, does not suffer significant reduced capacity at a c/5 discharge rate.

Conventional preparation of nickel hydroxide materials using a secondary nickel source was not considered feasible until now, due to effects that contaminants may have on positive, battery electrode performance and the active, positive electrode material. In fact, making nickel hydroxide material with a secondary nickel source using conventional methods normally fails to provide a nickel hydroxide material suitable for use in a battery electrode.

Example:

Four samples of a nickel hydroxide material were prepared from a secondary nickel source. Sample 1 was prepared using a simultaneous mixing/precipitation reaction as described in the specification above. Sample 2 was prepared using the same method as Sample 1 with an added carbonate precipitation step. Samples 3–4 were prepared in accordance with the above-described method including the carbonate precipitation step of Sample 2 with the additional evaporation/precipitation step as described in the specification above. A summary of the results obtained for Samples 2, 3 & 4 are listed in Table 3.

Sample 1.

A secondary nickel sulfate solution containing high calcium (2 g/l) and sodium levels (15 g/l) was used to make nickel hydroxide material (Sample 1). The nickel hydroxide material was prepared using a precipitation reaction. The Nickel hydroxide prepared with a secondary nickel sulfate solution with high sodium and high calcium was found to be substandard with a low tap density (<2 g/cc). BET surface area was found to be high (>30 m$^2$/g) on these powders. Nickel hydroxide prepared using this particular nickel sulfate solution was not suitable for battery applications.

Sample 2.

A secondary nickel sulfate solution containing high calcium and sodium levels was used to produce a nickel hydroxide material (Sample 2) using the same method as in Sample 1 above, but further including a carbonate precipitation reaction, water rinse, followed by conversion to nickel sulfate solution as described in the specification above. After converting to nickel sulfate, the calcium concentration in the final nickel solution was found to be about 0.4 g/l. Sodium, however, was still high at 14 g/l. Nickel hydroxide prepared using this secondary nickel sulfate solution yielded a powder having low tap densities (1.24 g/cc) and high surface area (>30 m$^2$/g). Such a powder was not suitable for battery applications.

Samples 3–4.

A secondary nickel sulfate solution containing high calcium and sodium levels was used to produce nickel hydroxide material (Samples 3–4) using the same method as for Sample 2 but further including the condensation/precipitation step as described in the specification above. In this case, after the nickel carbonate was converted to nickel sulfate, the nickel sulfate crystals were separated from the solution and redissolved in water to form a nickel sulfate solution. Calcium and sodium levels in the nickel sulfate starter solution were found to be 0.4 g/l, 3.9 g/l and 0.0, 2.2 g/l respectively for Samples 3 & 4. Nickel hydroxide powders were prepared from each nickel sulfate starter solution. Samples 3 & 4 showed suitable tap densities (~2 g/cc) and surface areas (~25 m$^2$/g) for use as a positive electrode material in a battery.

TABLE 3

Composition Of Nickel Sulfate

| Element | Sample 2 | Sample 3 | Sample 4 |
|---|---|---|---|
| Ni | 139 g/l | 130 g/l | 137 g/l |
| Co | 0.0 | 0.0 | 0.0 |
| Cd | 0.0 | 0.0 | 0.0 |
| Zn | 0.0 | 0.0 | 0.0 |
| Fe | 0.0 | 0.0 | 0.0 |
| Cu | 0.0 | 0.0 | 0.0 |
| Mn | 0.0 | 0.0 | 0.0 |
| Pb | 0.0 | 0.0 | 0.0 |
| Ca | 0.4 | 0.4 | 0.0 |
| Mg | 0.0 | 0.0 | 0.0 |
| Na | 14.0 | 3.9 | 2.2 |
| Ni(OH)$_2$ Quality | Poor | Good | Good |

As the results in Table 3 demonstrate, the active material prepared with a secondary nickel without a carbonate addition and a condensation/precipitation step failed to produce a nickel hydroxide material suitable for use as a battery electrode material. The nickel hydroxide material produced with a secondary nickel in accordance with the present method produces particles having a surface area, a tap density, and a crystallinity suitable for use as a battery electrode material.

While the invention has been illustrated in detail in the drawings and the foregoing description, the same is to be considered as illustrative and not restrictive in character. It is understood that only the preferred embodiments have been shown and described fully and that all changes and modifications that come within the spirit of the invention are desired to be protected.

What is claimed is:

1. A process for making an active, positive battery electrode material for a battery comprising the steps of:
   providing a secondary nickel sulfate solution having contamination,
   reducing the contamination to provide treated secondary nickel; and
   forming the treated secondary nickel into an active, positive battery electrode material.

2. The process of claim 1 wherein the step for forming comprises providing the secondary nickel as a nickel salt solution and concurrently combining the nickel salt solution with ammonium ions and hydroxide ions.

3. The process of claim 2 wherein the step for forming comprises a continuosly stirre precipitation reaction without a preamine reactor.

4. The process of claim 1 wherein the secondary nickel sulfate solution is an electroplating, electroless plating or electrorefining process solution.

5. The process of claim 4 wherein the nickel sulfate solution comprises at least 100 g/l of nickel.

6. The process of claim 1 wherein the method further comprises a raw material blending step, an intermediate material blending step or a final product blending step.

7. The process of claim 1 wherein the active, positive battery electrode material is a nickel hydroxide material.

8. In a process for making an active, positive battery electrode material including the steps of providing a nickel sulfate solution and forming the nickel sulfate solution into an active, positive battery electrode material, the improvement characterized by:
   providing a secondary nickel sulfate solution having 0.05% or more dissolved metals and concurrently combining the secondary nickel sulfate solution with ammoniums ions, and hydroxide ions to provide all active, positive battery electrode material.

9. The process of claim 8 wherein the step for concurrently combining comprises continuously stirring.

10. The process of claim 8 further including: providing a second metal salt solution having metal ions different from the metal ions of the secondary nickel sulfate solution, and concurrently combining the second metal salt solution with the secondary nickel sulfate solution, the ammonium ions, and the hydroxide ions to provide an active, positive battery electrode material.

11. The process of claim 8 wherein the active, positive battery electrode material is a nickel hydroxide material.

12. The method of claim 8 wherein the secondary nickel sulfate solution has greater than 0.05 wt % to 9 wt % contaminants.

13. The method of claim 8 wherein the secondary nickel sulfate solution has greater than 0.4 wt % contaminants.

14. A method for making an active positive battery electrode material comprising the steps of:
   providing an initial, secondary nickel sulfate solution having a contamination that adversely effects the quality of active material for use in a battery;
   reducing the contamination of the secondary nickel sulfate solution to provide a treated secondary nickel source;
   converting the treated secondary nickel source into a nickel salt solution; and
   converting the nickel salt solution into nickel hydroxide material.

15. The method of claim 13 wherein the step for converting comprises concurrently combining the nickel salt solution with ammonium ions and hydroxide ions.

16. The method of claim 15 wherein the step for converting is a continuously stirred precipitation reaction.

17. The method of claim 14 wherein the step for reducing comprises at least one blending step.

18. The method of claim 17 wherein the blending step is a raw material blending or an intermediate material blending.

19. The method of claim 17 wherein the blending step is a raw material blending or an intermediate material blending.

20. The method of claim 14 wherein the secondary nickel sulfate solution is a spent solution from a nickel electrorefining process, nickel electroless plating process or nickel electroplating process.

21. A method for making modified nickel hydroxide material comprising tile steps of:
   providing secondary nickel sulfate; and
   converting the secondary nickel sulfate into a modified nickel hydroxide positive electrode material.

* * * * *